Sept. 19, 1967 N. A. KNIGHT 3,342,329
CARTONS FOR POTTED PLANTS AND FLOWERS
Filed March 18, 1965 3 Sheets-Sheet 1

INVENTOR
Noble A. Knight

Sept. 19, 1967   N. A. KNIGHT   3,342,329
CARTONS FOR POTTED PLANTS AND FLOWERS
Filed March 18, 1965   3 Sheets-Sheet 2

INVENTOR
Noble A. Knight

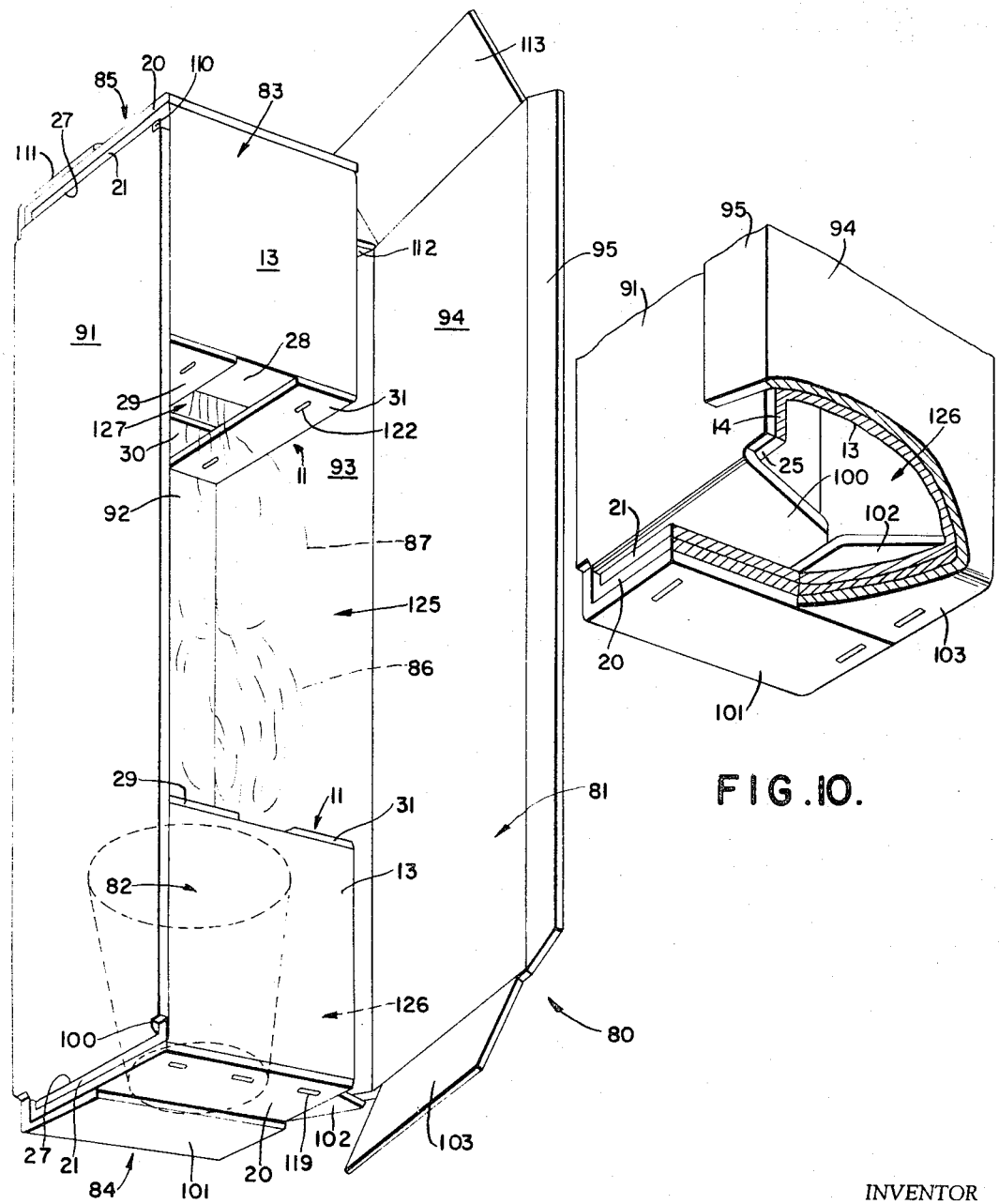

United States Patent Office

3,342,329
Patented Sept. 19, 1967

3,342,329
CARTONS FOR POTTED PLANTS AND FLOWERS
Noble A. Knight, Richmond, Va., assignor to West Virginia Pulp and Paper Company, New York, N.Y., a corporation of Delaware
Filed Mar. 18, 1965, Ser. No. 440,713
13 Claims. (Cl. 206—65)

ABSTRACT OF THE DISCLOSURE

A container for transporting potted plants without danger of damage to the plants. The container includes an inner box into which the pot is placed and which can be closed and handled as a separate unit before the inner box is placed in the outer box. The inner box is fixed against movement in the outer box by a flap, at an end of the outer box, which extends through a slot in the inner box. A second inner box can be provided to pack two plants in a single outer box with the plants extending toward each other.

This invention relates generally to containers and more particularly to shipping cartons for potted plants and flowers.

More specifically the present invention is concerned with a unique carton arrangement for the shipping of nursery plants and, although the carton is particularly adapted for shipping potted plants is readily usable for shipping with roots in a ball of earth wrapped in burlap.

In the nursery industry there has long been a need for a durable relatively strong carton for shipping plants from the nursery to local distributors and home owners. There has also been a need for a shipping carton which is simple to assemble so that inexpensive unskilled help can be used to pack the plants and flowers for shipment. It is to be appreciated that cartons for shipping plants must be sufficiently durable to comply with government postal regulations, and to permit rough handling without damage to the pot and plant therein and that it is also necessary that the carton be relatively light in weight to maintain mailing costs at a minimum amount. These considerations of course require a compromise in strength versus weight to provide a suitable carton for the required purpose.

In the past a variety of different carton constructions have been used but without complete success. In at least one of these prior art cartons a potted plant is retained at one end of the carton by flaps which extend inwardly from opposite side walls of the carton structure. This provides a compartmented arrangement whereby the foliage of the plant extends into a portion of the carton separated from the portion surrounding the pot. The disadvantage of this structure is the openings left in the side walls of the carton by the flaps which extend inwardly to retain the pot in position. These openings frequently permit the earth in which the plant is planted to sift out of the carton. The openings also permit the loss of moisture and humidity from within the container and hence, the plants are frequently wilted on arrival at their destination. In addition to these shortcomings the carton lacks rigidity and durability sufficient to prevent damage to the pot and foliage of the plant if the carton is not carefully handled.

In another known prior art carton for shipping plants a standard carton of the size and shape to receive a potted plant is provided. The pot is retained adjacent one end of the carton by a pair of retaining members having inwardly folded portions which engage the upper end of the pot and wall portions which extend the length of the carton and are secured to the opposite side walls thereof. A striking disadvantage of this construction is the increased weight attributable to the retaining boards which function merely to maintain the pot in position but which do not materially contribute to the overall strength of the carton.

In view of these deficiencies of the prior art, applicant has devised an improved shipping carton for potted plants which overcomes the deficiencies of the prior containers. In accordance with applicant's invention the carton arrangement includes an elongated outer box and relatively short inner box uniquely secured to one end of the outer box. The inner box provides a chamber to house the pot whereas the remaining interior of the outer box houses the foliage of the plant. The inner box is dimensioned so that its side walls engage the inner surfaces of the side walls of the outer box. Also, the end walls of the inner box cooperate with the end walls of the outer box to form a portion of the end structure of the completed carton. By virtue of this arrangement the inner box reinforces both the end structure and the side wall structure of the outer box to provide an extremely rigid and durable carton.

The inner and outer boxes are so constructed that at least a portion of the end structure of the inner box extends into the end structure of the outer box to secure the boxes together. The end of the inner box remote from the carton end structure defines an opening through which the stem of the plant extends.

In one embodiment of the applicants' invention only one inner box is secured to the outer box and the completed carton is used to ship a single plant. In another embodiment an inner box is placed at each end of the carton and two potted plants are packed with the foliage of each extending into the common compartment between the inner boxes. In each embodiment the inner box is initially separate from the outer box and the potted plant is completely packed in the inner box before the inner and outer boxes are connected together.

For economy of shipment of a supply of empty boxes to the nursery or garden shop which packs the plants, both the inner and outer boxes are shipped as flat, precut and prescored blanks. By virtue of the prescoring it is a simple matter for unskilled nursery held to erect the cartons and pack same after the plants to be shipped have been carefully selected by an experienced nursery man.

Correspondingly, an object of this invention is a rigid and durable shipping carton comprised of an inner box and an outer box.

Another object is a shipping container for plants in which an inner box which houses the plant pot is securely fastened adjacent one end of an outer box which houses the plant foliage.

Another object is a plant shipping carton comprised of an inner box and an outer box in which the end wall of the inner box interlocks with a portion of the end wall of the outer box to provide a rigid durable shipping container.

A further object is a shipping container for potted plants comprised of an outer box and an inner box secured to each end of the outer box so that two potted plants may be packed in the same container with one pot in each of the inner boxes and the foliage extending into a common compartment between the two inner boxes.

A further object is a shipping carton for plants in which an inner box is completely separate from an outer box so that the potted plant may be packed in the inner box, but the inner box need not be connected to the outer box until the time of shipment.

A further object is a shipping carton for plants comprised of an inner box and an outer box and in which the outer box is around the inner box to assemble the carton.

A further object is a shipping carton for plants in which the end structure of an outer box includes a pair of flaps projecting from the opposite side walls thereof which extend between the lower edge of opposite side walls of an inner box and the end structure of the inner box formed by the end flaps thereof, this arrangement functioning to reinforce the end wall of the assembled carton.

A still further and quite significant object is a carton for shipping plants which includes an inner box and an outer box which are shipped to the packer of the carton in a flat blank condition, which are easily assembled, and which are so dimensioned that the inner box affectively reinforces the outer box against damage during transit.

The following specification, of which the accompanying drawings form a part, explains the manner in which the foregoing objects are attained in accordance with this invention. In the drawings:

FIG. 7 is an enlarged view in perspective of a second embodiment of the invention adapted for the shipping of two potted plants, with the cover of the outer box opened;

FIG. 10 is an enlarged partial view in perspective, with portions thereof cut away, to show the details of the end structure arrangement for retaining the inner box in position at an end of the outer box.

Figure 1:
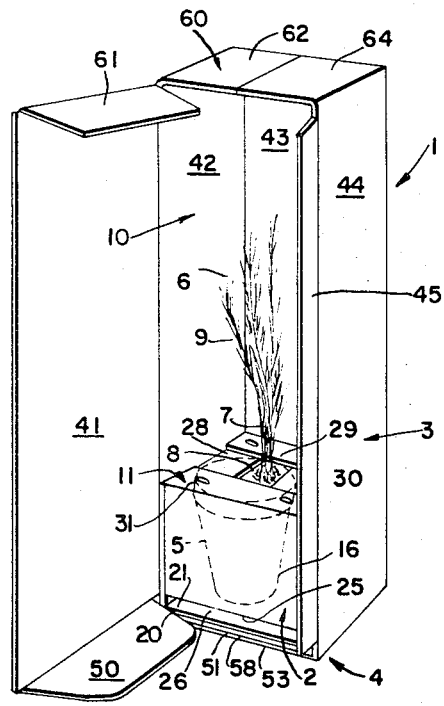
FIG. 1 is a view in perspective showing a first embodiment of the invention with the side of the outer box opened.

Referring now to the drawings in detail, FIG. 1 shows a first embodiment of the container of this invention particularly suitable for shipping a single potted plant. As shown in FIG. 1, carton 1 is comprised of an inner box 2 disposed within an outer box 3 and connected thereto adjacent a first end 4 of the outer box 3. The pot 5 of a plan 6 is encased in inner box 2 with the closed end of the pot facing toward end 4, and stem 7 of the plant extending through opening 8 of the inner box so foliage 9 of the plant is in a chamber 10 defined by the walls of the outer box and the inner end 11 of the inner box.

Figure 5:
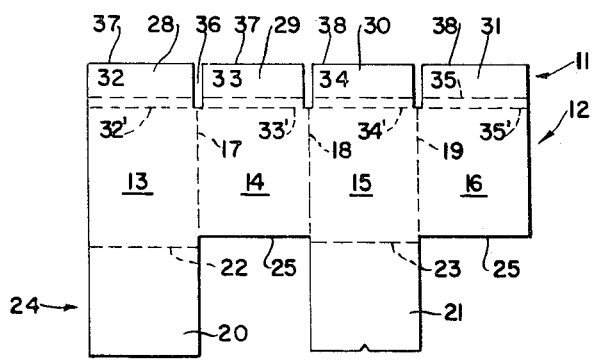
FIG. 5 is a plan view of a precut blank from which the inner box of FIG. 4 is formed.
Figure 6:
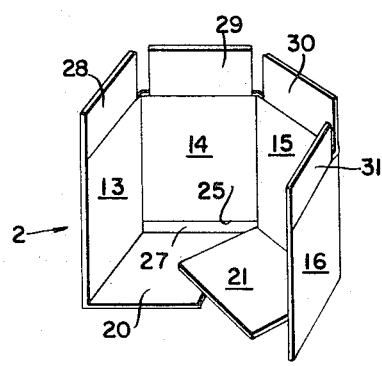
FIG. 6 is a view in perspective showing the inner box partially erected.
Figure 4:
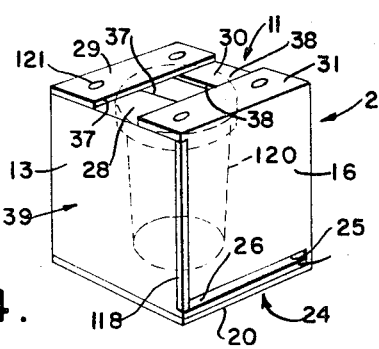
FIG. 4 is a view in perspective showing the inner box of this invention.

Referring now to FIGS. 4–6, inner box 2 is seen to be erected from a precut and prescored inner box blank 12 which is shipped to the plant packer in its flattened condition as shown in FIG. 5. Inner box blank 12 is integral and is preferably formed from a sheet of cardboard in laminated form having a central corrugated layer and a smooth face on each side provided by surface layers of paper bonded to the corrugated layer.

Inner box blank 12 has a side wall structure comprised of rectangular side panels 13–16, inclusive, separated from one another by straight longitudinal score lines 17–19, inclusive, and along which the side panels are folded to erect the inner box. Integral with side panels 13 and 15 and extending longitudinally therefrom are first and second rectangular end flaps 20 and 21, respectively, each having a width similar to the side panel from which it extends. End flaps 20 and 21 are separated from panels 13 and 15 by transverse score lines 22 and 23, respectively. Flaps 20 and 21 each have the same length as measured from score lines 22 and 23, respectively, to the end edges of the flaps. This length is slightly less than the width of identical panels 14 or 16 to enable flap 20 to be folded inwardly across flap 21 so that the flaps lie in adjacent planes to form first end structure 24. End edges 25 of side panels 14 and 16 are coplanar and are spaced from and parallel with score lines 22 and 23. Score lines 22 and 23 are not collinear but are parallel, with score line 23 closer to the plane of end edges 25 than score line 22. Such spacing of score lines 22 and 23 compensate for the thickness of the cardboard of blank 12 when end flap 20 is folded across end flap 21. It is to be noted that score lines 22 and 23 are each spaced from the plane of bottom edges 25 of panels 14 and 16, respectively, to provide elongated slots 26 and 27 in registry with each other at opposite sides of inner box 2, as shown in FIGS. 4 and 6.

A second end structure provided by end 11 of inner box 2 is comprised of rectangular end flaps 28–31 which extend longitudinally from the other end of side panels 13–16, respectively, and are separated therefrom by a double row of parallel transverse score lines 32–35 and 32'–35', respectively, which separate end flaps 28–31 from side panels 13–16. The advantage of double score lines between end flaps 28–31 and side panels 13–16 is to permit forming the second end structure of the inner box with end flaps 29 and 31 folded across end flaps 28 and 30, as shown in FIG. 4, and also to permit folding of end flaps 28 and 30 across end flaps 29 and 31, if desired, during the closing of the second end structure. Adjacent ones of end flaps 28–31 are separated by slots formed by cutting away a portion of the material as at 36 to prevent interference of the side edges of the flaps with each other during folding.

Each of end flaps 28 and 30 has a length less than one-half the width of identical side panels 14 and 16. Similar end flaps 29 and 31 each have a length less than one-half the width of identical side panels 13 and 15. Hence, the end edges 37 and 38 of each opposite pair of the end flaps are spaced apart, as shown in FIG. 4, to define the generaly centrally disposed rectangular opening 8 through which the stem of the plant extends.

With reference to FIGS. 4–6, and in view of the foregoing description, it is apparent that side panels 13–16 of inner box 2 provide a side wall structure 39 with panels 13 and 15 providing a first pair of panels and panels 14 and 16 providing a second pair of panels, that flaps 20 and 21 provide a first end structure 24 and that flaps 28–31 provide a second end structure at end 11 of the inner box.

Figure 2:
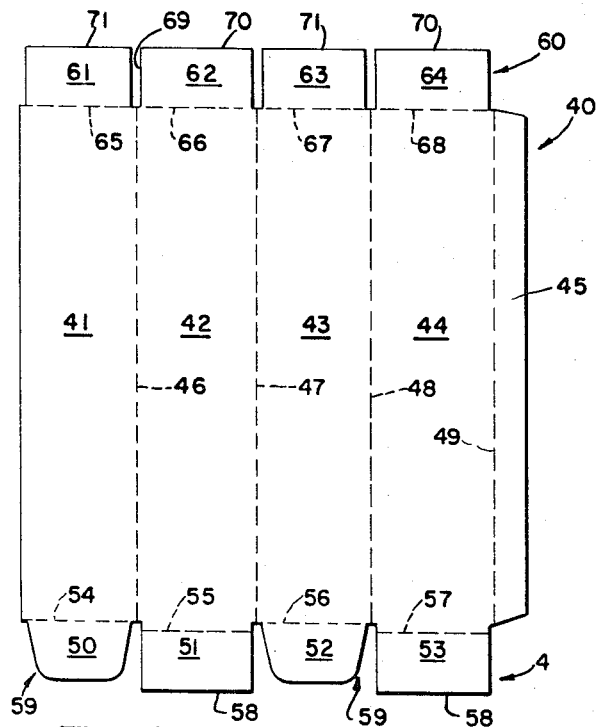
FIG. 2 is a plan view showing the precut blank from which the outer box of the embodiment of FIG. 1 is formed.

Outer box 3 is erected from a precut and prescored outer box blank 40 which is shipped to the plant packer or nursery in its flattened condition, as shown in FIG. 2. Outer box blank 40 is also integral and is formed from the same cardboard material as inner box 2. Outer box blank 40 has a side wall structure comprised of a first rectangular side panel 41, a rectangular back panel 42, a second rectangular side panel 43, a cover in the form of a rectangular front panel 44, and a narrow closure flap 45 each separated from the other by longitudinal score lines 46–49. First end 4 of outer box 3 includes end flaps 50–53 separated from panels 41–44 by transverse score lines 54–57, respectively. Flaps 51 and 53 are each rectangular and have a length, as measured from the respective score lines 55 and 57 to the end edges of the flaps, which is equal to one-half the width of either of identical panels 41 and 43 so that end edges 58 of end flaps 51 and 53 abut, as shown in FIG. 1, when the outer box is erected.

First end flap 50 and second end flap 52 are each identical and are generally trapezoidally shaped and provided with rounded sides at the outer extremities thereof, as at 59, for a purpose which will subsequently be described in detail. End flaps 50 and 52 each have a length equal to one-half the width of identical panels 42 and 44 so their end edges abut when the outer box is closed. It is to be noted that score lines 54 and 56, which are collinear, are parallel with and spaced inwardly of collinear score lines 55 and 57. Such spacing is provided to permit folding of flaps 50 and 52 inwardly of flaps 51 and 53 so that the respective pairs of flaps are disposed in spaced apart parallel planes, as is best visualized with reference to FIGS. 1 and 3.

A second end structure 60 of outer box 3 is comprised of rectangular end flaps 61–64 extending longitudinally from panels 41–44, respectively, and separated therefrom by transverse score lines 65–68. Each of flaps 61–64 is separated from the adjacent one of the flaps by slots formed by cutting away the material, as at 69. This provides clearance to prevent the material of the flaps from interfering with folding the flaps inwardly to close the end 60 of outer box 3.

End flaps 61–64 are each rectangular, and flaps 61 and 63 form a first pair of end flaps, whereas flaps 62 and 64 form a second pair of end flaps. End flaps 62 and 64 each have a length equal to one-half the width of identical panels 41 or 43 so that end edges 70 of panels 62 and 64 abut when folded inwardly, as shown in FIG. 1. Similarly, end flaps 61 and 63 each have a length equal to one-half the width of identical panels 42 or 44 so that their respective end edges 71 abut when folded inwardly and the box is closed.

FIG. 7 shows a second embodiment of the plant shipping carton of this invention which is particularly suitable for shipping two potted plants in a carton 80. Carton 80 is comprised of an outer box 81, a first inner box 82 which is identical to inner box 2 of FIGS. 4–6, and a second inner box 83 identical with inner boxes 2 and 82. Since inner boxes 2, 82, and 83 are each identical, the identifying numerals of FIGS. 4–6 will be used to identify the various elements of these several inner boxes.

As shown in FIG. 7, first inner box 82 extends within outer box 81 from a first end structure 84 of the outer box. Second inner box 83 is inverted relative to inner box 82 and extends into outer box 81 from its second end structure 85. First inner box 82 provides a chamber therein to house the pot portion of a plotted plant 86, whereas the second inner box 83 provides a chamber therein to house the pot portion of a potted plant 87, with the foliage of plants 86 and 87 extending into the chamber 88 defined between the inwardly facing ends 11 of inner boxes 82 and 83.

Figure 8:
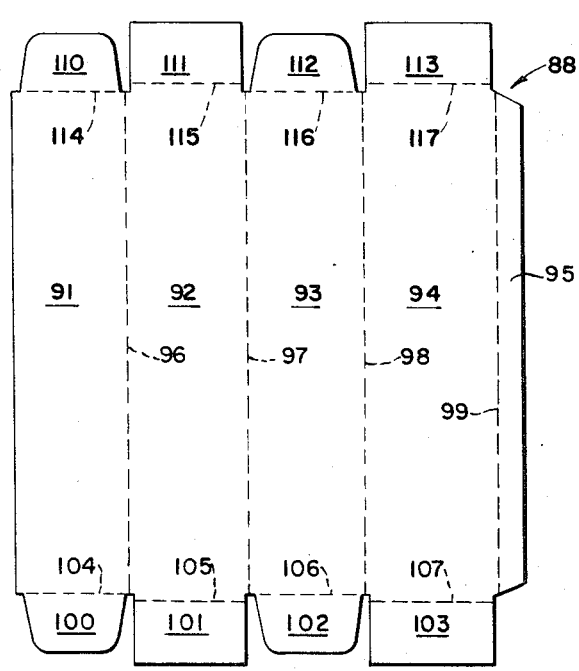
FIG. 8 is a view of the precut blank from which the outer box of FIG. 7 is formed.
Figure 9:
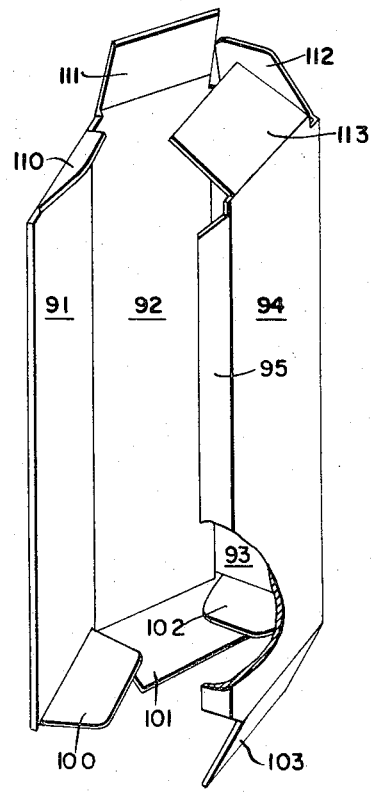
FIG. 9 is a view in perspective showing the outer box of FIG. 7 partially erected.

Outer box 81 is erected from a precut and prescored outer box blank 90 which is shipped to the plant packer in its flattened condition, as shown in FIG. 8. Outer box blank 90 is comprised of a first rectangular side panel 91, a rectangular back panel 92, a second rectangular side panel 93, a cover in the form of a rectangular front panel 94, and a narrow closure flap 95 separated from each other by longitudinal score lines 96–99, respectively. Extending longitudinally from panels 91–94 are end flaps 100–103 separated from the respective panels by transverse score lines 104–107. It is to be noted that outer box blank 90, as thus described, is identical with the corresponding portions of outer box blank 40 and that panels 41–44 are identical to panels 91–94 and similarly end flaps 50–53 are identical to end flaps 100–103. At the ends of panels 91–94 opposite flaps 100–103 are end flaps 110–113 which extend respectively from panels 91–94 and are separated therefrom by transverse score lines 114–117. End flaps 110 and 112 are identical to each other and are also identical to end flaps 100 and 102 at the opposite end of box blank 88. Similarly, end flaps 111 and 113 are identical to each other and are identical to end flaps 101 and 103. Score lines 104 and 106 are collinear and are spaced inwardly of collinear score lines 105 and 107. Similarly, transverse score lines 114 and 116 are collinear and are spaced inwardly of and parallel with collinear score lines 115 and 117.

FOLDING AND ASSEMBLY

The first step in the assembly of carton 1 is the folding of inner box 2. Such folding is best accomplished in the manner shown in FIG. 6 by first folding adjacent ones of panels 13–16 at right angles to each other along score lines 17–19, respectively. End flap 21 is then folded inwardly and end flap 20 is folded inwardly across end flap 21. The abutting side edges of panels 13 and 16 are then joined with a piece of gummed tape 118 which extends substantially the height of the inner box, as best seen in FIG. 4. End flaps 20 and 21 may be secured together with carton staples, for example, staples 119 (FIG. 7) in the well known manner. The pot portion of a potted plant is then placed into the inner box before end flaps 28–31 are folded inwardly along their respective score lines. The inner box is so selected that its side wall structure 39 has a height approximately equal to the height of the pot 120 of the plant to be packed. Then, when flaps 28 and 30 are folded inwardly, and end flaps 29 and 31 are folded across flaps 28 and 30, as shown in FIG. 4, the end structure 11 provided by these flaps prevents movement of the plant pot 120 in a vertical direction out of the inner box. The top of pot 120 is packed with crepe wadding to prevent sifting of earth from the top of the pot. Flaps 28–31 are then secured with carton staples such as 121 to retain the plant pot within the inner box. It is to be noted that, in the erected box, side panels 13 and 15 are spaced apart and parallel to each other, and similarly side panels 14 and 16 are spaced apart and parallel with each other. Thus, it is apparent that inner box 2 is rectangular as viewed in transverse section.

Figure 3:
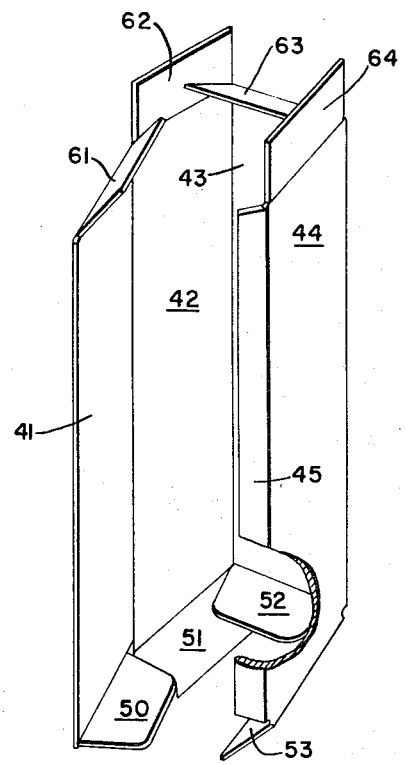
FIG. 3 is a view in perspective showing the outer box of the first embodiment partially erected.

The next step is the folding and erecting of the outer box, as best seen in FIG. 1–3. Adjacent ones of panels 41–44 are folded at right angles to each other along fold lines 46–48, respectively, to form a generally rectangular side wall structure, and rounded end flaps 50 and 52 are then folded inwardly, as best seen in FIG. 3. Next, end flaps 51 and 53 are folded inwardly across flaps 50 and 52 to define the first end structure of the outer box; end flaps 61 and 63 are folded inwardly and end flaps 62 and 64 are folded inwardly across end flaps 61 and 63.

After these initial folds have been made in outer box 3, the outer box is opened and unfolded sufficiently that end flaps 50 and 52 are clear of end flap 51. Inner box 2 is then placed with its side panel 13 adjacent rear panel 42 of the outer box and with its first end structure on top of end flap 51 of outer box 3 so that slots 26 and 27 are transverse to rear panel 42. End flap 52, having rounded edges 59, is then guided into slot 25 of inner box 2 as the outer box is folded around the inner box. Simultaneously, end flap 50 is guided into slot 26 of inner box 2 until the end edges of flaps 50 and 52 abut. The rounded edges 59 of these flaps facilitate entry in slots 26 and 27. It is to be noted that flaps 50 and 52 extend between end flaps 20, 21 and end edges 25 of panels 14 and 16 of the inner box to securely retain the inner box against movement from adjacent first end structure 4 of the outer box. Front panel 44 is then closed and closure flap 45 folded down to extend across the outer face of side panel 41. Closure flap 45 is then secured with carton staples or other conventional fasteners. If desired, similar fasteners, preferably carton staples, may be driven through second end 60 of the outer box as well as first end 4 of the outer box to rigidly secure the several layers of cardboard, provided by the flaps of the end structures, together. When so erected, closed, and fastened, the carton is ready for shipping by parcel post or freight.

The procedure for erecting and assembling the carton 80 of the second embodiment of FIGS. 7–10 is quite similar to that described for the first embodiment. The first step is to erect first inner box 82 and second inner box 83 in the manner previously described for inner box 2. A potted plant is placed in each box and the respective end flaps 20–21 of the first end structures of the boxes are closed and secured with carton staples 122 in the manner previously described.

The outer box is then prefolded to a general rectangular configuration and its end flaps are folded inwardly to approximately form the first and second end structures of the outer box. The outer box is then substantially unfolded and inner boxes 82 and 83 are placed adjacent the opposite ends of the outer box in the approximate position shown in FIG. 7. Side panel 91 is then folded inwardly while simultaneously guiding rounded end flaps 100 and 110 at the opposite ends thereof into one of the slots 27 at each end of inner boxes 82 and 83, respectively. Second side panel 93 is then folded inwardly while simultaneously guiding rounded end flaps 102 and 112 at the opposite ends thereof into slots 26 at the ends of inner boxes 82 and 83, respectively. When front panel 94 is folded inwardly and end flaps 103 and 113 are folded across the ends of the outer box to abut the edges, respectively, of end flaps 101 and 111, the outer box is closed and is then secured with staples extending through closure flap 95 into side panel 91. As best seen with reference to FIG. 10, end flaps 101 and 103 may also be secured adjacent first end 84 of the outer box with staples such as staples 123 appropriately located to secure these flaps to the underlying flaps. It is to be noted with reference to FIG. 10 that rounded flaps 100 and 102 extend respectively between end flaps 20, 21 of inner box 83 and the side wall structure of the inner box defined by side panels 14 and 16. Correspondingly, a portion of the first end structure of the inner box formed by end flaps 20 and 21 extends between rounded end flaps 100, 102 and rectangular end flaps 101, 103 of the outer box, as shown in FIGS. 7 and 10. It is to be understood that the first end structure 84 of the outer box, where the first end structure of inner box 82 is positioned contiguous with the end structure of the outer box, is identical to the securing arrangement of inner box 83 at second end structure 85 of outer box 81. It is also to be noted that the side panels 13–16 of the inner box are so dimensioned as to engage the inner surfaces of side panels 91–94, respectively, of the outer box and hence act to reinforce the side wall structure of the outer box. Reinforcement is also provided at each end of the carton by the several layers of additional material provided by end flaps 20 and 21 of the inner box in addition to the end flaps 110–113 of the outer box at end 85 and end flaps 100–103 of the outer box at end 84.

In the embodiment of carton 80, the height of each inner box is approximately one-quarter the height of the side wall structure of the outer box 81 to define a chamber 125 to receive the foliage of plants 86 and 87 between the second end structures of the inner boxes. The chamber 126 for receiving the pot of plant 86 is likewise defined in the interior of inner box 82 and an additional chamber 127 for the pot of plant 87 is defined by the interior of second inner box 83. In each instance, the pot is retained in the inner box, the stem of the plant extends through the opening defined between the end edges of flaps 28–31 of the second end of the inner box, and the foliage is in the chamber 125 defined by the panels 91–94 of the outer box and the facing second ends 11 of the inner boxes.

Although two preferred embodiments have been shown and described and the dimensional relationships thereof set forth in detail with the inner and outer boxes oriented in a preferred manner, it is to be understood that numerous changes and variations can be made in the structures of the inner and outer boxes of the disclosed carton without departing from the scope of the invention as defined in the appended claims.

What is claimed is:

1. A carton comprising, in combination, an outer box comprising
   a first side panel,
   a second side panel opposite said first panel,
   a back panel connected to the corresponding sides of said first and second panels,
   a front panel hingedly connected to the side of one of said side panels opposite said back panel,
   a first end structure connected to one end of said panels, and
   a second end structure connected to the opposite end of said panels,
   said first end structure including
   first and second flap members connected to the corresponding ends respectively of two opposite ones of said panels, said flap members extending toward each other;
   an inner box securable within said outer box and comprising
   a first pair of side panels, and
   a second pair of side panels connected respectively to the opposite side edges of each of said first pair of side panels,
   a first end structure including first and second flaps hingedly connected respectively to the corresponding ends of one of said pair of side panels and dimensioned to overlap each other, and
   a second end structure including flaps hingedly connected to the end of said inner box opposite said first end structure,
   said inner box having first and second generally aligned transversely extending slots at opposite sides thereof and adjacent said first end structure of said inner box;
   said inner box being mounted within said outer box with its first end structure adjacent the first end structure of said outer box;
   said first and second flap members of said outer box extending through said first and second slots, respectively, of said inner box to retain the inner box in position within said outer box.

2. A carton in accordance with claim 1 in which
   said first and second end structures of said outer box are identical, and
   which further includes a second inner box, substantially identical to said aforementioned inner box, and similarly retained within said outer box adjacent the second end structure of said outer box so said inner box and second inner box extend toward each other from opposite ends of said outer box.

3. A carton in accordance with claim 1 in which
   said first and second flap members of said outer box are connected, respectively, to said first and second side panels, and
   said inner box is mounted within said outer box by folding the side panels of the outer box around said inner box and guiding said first and second flap members into said slots of said inner box.

4. A carton in accordance with claim 1 in which
   said second end structure of said inner box includes
   a first pair of flaps hingedly connected respectively to said first pair of side panels, and
   a second pair of flaps hingedly connected respectively to said second pair of side panels,
   said pairs of flaps being folded inwardly toward each other to provide said second end structure, at least a portion of each of said flaps having a length less than half the width of the inner box along which it extends;

whereby said flaps of said second end structure of said inner box define an opening to receive the stem of a plant adapted to be placed in said inner box.

5. A shipping carton comprising in combination
an outer box erectable from a flattened precut blank of integral construction comprising
a side wall portion including longitudinal score lines defining a first side panel, a back panel, a second side panel, and a front panel,
a first end portion including transverse score lines defining an end flap at one end of each of said panels, and
a second end portion including transverse score lines defining an end flap at the other end of said panels;
said side wall portion being foldable along said longitudinal score lines to provide a generally rectangular side wall structure as viewed in transverse section with said side panels opposite each other and said front panel opposite said back panel;
said end flaps each being foldable along said transverse score lines to close the ends of said outer box, at least two of said end flaps on opposite ones of said panels at said one end having a length not greater than half the width of the outer box;
an inner box mountable within said outer box and erectable from a flattened precut blank comprising
a side wall portion including longitudinal score lines defining a first pair of spaced apart side panels, and a second pair of spaced apart side panels connected to said first pair,
a first end portion including a transverse score line defining at least one end flap at one end of one of said side panels of said first pair;
a second end portion including score lines defining end flaps at the other end of said side panels;
said side wall portion of said inner box being foldable along said longitudinal score lines to provide a generally rectangular side wall structure as viewed in transverse section with said panels of each pair opposite each other;
said at least one end flap of said inner box being foldable along said transverse score line to extend across said one end of said inner box, said one flap being secured to said inner box at another location spaced from said transverse score line in a manner to provide a space between the end edges of said second pair of side panels and said one end flap;
said inner box being mounted within said outer box with said first end structures of said boxes adjacent each other;
said at least two of said end flaps of said outer box extending into said space between the end edges of said second pair of side panels and said one end flap of said inner box to retain said inner box against movement relative to said outer box.

6. A carton in accordance with claim 5 in which
said first end portion of said inner box further includes a transverse score line defining a second end flap at the end of the second one of said first pair of side panels,
said second end flap being foldable across said one end flap and connected thereto to secure said one end flap to said inner box.

7. A carton in accordance with claim 5 in which
said carton further includes a second inner box substantially the same as said first inner box, said second inner box being secured to said outer box with its first end adjacent said second end of said outer box.

8. A carton for potted plants comprising, in combination,
an outer box comprising a side wall structure including a plurality of side panels and a cover panel
said side wall structure, when closed by said cover panel, defining a space therein of essentially uniform cross section,
a first end structure connected to one end of said panels, and
a second end structure connected to the opposite end of said panels,
said first end structure including a flap connected to an end of one of said panels and extending in a direction transversely of the side wall structure;
an inner box capable of being completely assembled outside of and separate from said outer box and securable within said outer box, said inner box comprising
a said wall structure including side panels equal in number to the side and cover panels of said outer box, and dimensioned to lie against the inner surfaces of the panels of said outer box.
a first end structure including flap means connected to an end of at least one of said side panels of said inner box and extending across the end of the inner box, and
a second end structure connected to the opposite end of said side panels;
said inner box being capable of receiving therein the pot of a potted plant having a stem extending from the pot, said second end structure of said inner box retaining said plant pot against movement from said inner box and having an opening therein through which the stem of the plant extends;
said inner box having a transversely opening slot adjacent said first end structure thereof;
said side wall structure of said inner box being substantially shorter than the side wall structure of said outer box;
said inner box being positioned within said outer box in engagement with the first end structure of said outer box;
said flap of the end structure of said outer box extending through said slot of said inner box to retain the inner box in position within said outer box;
whereby, the pot of the potted plant can be placed in the inner box, and the inner box can be completely assembled before the inner box is positioned in and retained in said outer box.

9. A carton for potted plants according to claim 8 wherein
said transversely opening slot is defined in part by an end edge of one of said side panels of said inner box and in part by a surface of said flap means of said inner box.

10. A carton for potted plants according to claim 8 wherein
said second end structure of said outer box includes a flap connected to an end of one of said panels of said outer box and extending in a direction transversely of the side wall structure of the outer box;
and which further includes, a second inner box like said aforementioned inner box, said second inner box being positioned in said outer box in engagement with said second end structure of said outer box and being secured therein by said flap of said second end structure of said outer box, said second inner box extending toward said first mentioned inner box.

11. A carton according to claim 8 wherein:
said plurality of side panels of said outer box includes a pair of spaced apart opposed side panels, and
a rear panel connected to corresponding sides of said pair of side panels;
said cover panel being hingedly connected at a score line to an opposite side of one of said side panels.

12. A carton according to claim 11, which further includes
a closure flap hingedly connected to a side of said cover panel, said closure flap extending the length of said cover panel.

13. A carton in accordance with claim 8 in which
said inner box is formed from an integral sheet of carton material, and
said outer box is formed from an integral sheet of carton material.

References Cited

UNITED STATES PATENTS

| 880,549 | 3/1908 | Lord | 229—37 |
| 1,669,617 | 5/1928 | Kennedy | 206—46 |

FOREIGN PATENTS 1,284,628   1/1962   France.

THERON E. CONDON, *Primary Examiner.*

WILLIAM T. DIXSON, JR., *Examiner.*